United States Patent [19]

Poletto et al.

[11] 3,912,746

[45] Oct. 14, 1975

[54] SUBSTITUTED NITROGEN CONTAINING HETEROETHYLENEINDOLES

[75] Inventors: John Frank Poletto, Nanuet, N.Y.; George Rodger Allen, Old Tappan, N.J.; Ruddy Littell, River Vale, N.J.; Martin Joseph Weiss, Oradell, N.J.

[73] Assignee: American Cyanamid Company, Stamford, Conn.

[22] Filed: Nov. 1, 1973

[21] Appl. No.: 412,022

Related U.S. Application Data

[60] Division of Ser. No. 221,759, Jan. 28, 1972, Pat. No. 3,801,594, which is a continuation-in-part of Ser. No. 68,005, Aug. 28, 1970, Pat. No. 3,686,213, which is a continuation-in-part of Ser. No. 1,045, Jan. 6, 1970, abandoned, which is a continuation-in-part of Ser. No. 603,772, Dec. 22, 1966, abandoned.

[52] U.S. Cl. .................. 260/296 B; 260/247.2 R; 260/326.14 R; 260/326.15
[51] Int. Cl.² ........................................ C07D 211/68
[58] Field of Search. 260/247.5 FP, 293.61, 326.15, 260/293.54, 296 B

[56] References Cited

UNITED STATES PATENTS

| 3,444,174 | 5/1969 | Remers et al. ................. 260/293.61 |
| 3,501,465 | 3/1970 | Shen et al. ................. 260/247.5 FP |
| 3,642,803 | 2/1972 | Welstead ......................... 260/296 B |

OTHER PUBLICATIONS

Mustzal C. A., Vol. 58, (1963), 13895(d).
Desaty et al., C. A., Vol. 62, (1965), 7716(d).

*Primary Examiner*—Lorraine A. Weinberger
*Assistant Examiner*—Richard D. Kelly
*Attorney, Agent, or Firm*—Ernest Y. Miller

[57] ABSTRACT

This invention describes new substituted indole compounds. Intermediate 3-halodicarbonyl indoles are also described. The preparation of the final products from the 3-halodicarbonyl indoles wherein the 3-position contains a substituted $\beta$-aminoethyl group in which the nitrogen of the amino group is a part of a heterocyclic ring, is described. The compounds have utility as central nervous system depressants, analgesics, anti-inflammatory agents, and diuretic agents.

3 Claims, No Drawings

SUBSTITUTED NITROGEN CONTAINING HETEROETHYLENEINDOLES

This invention is a division of application Ser. No. 221,759, filed Jan. 28, 1972 now U.S. Pat. No. 3,801,594 which is a continuation-in-part of our application Ser. No. 68,005, filed Aug. 28, 1970 now U.S. Pat. No. 3,686,213 which is a continuation-in-part of application Ser. No. 1,045, filed Jan. 6, 1970, now abandoned, which in turn is a continuation-in-part of our application Ser. No. 603,772, filed Dec. 22, 1966, now abandoned. An application Ser. No. 603,711, filed Dec. 22, 1966, now U.S. Pat. No. 3,449,363, describes intermediates useful in preparing compounds of the present invention.

This invention relates to new organic compounds, and more particularly, it relates to novel compounds of the following formula:

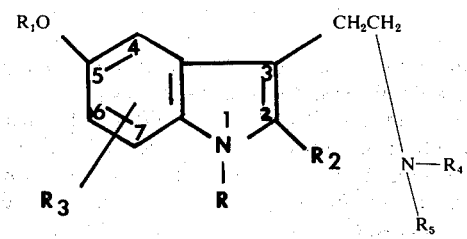

wherein R is hydrogen or a lower alkyl group; $R_1$, $R_2$ and $R_3$ are lower alkyl groups, $R_3$ being substituted at the 4-, 6- or 7-position of the indole nucleus;

taken together is a member of the group consisting of pyrrolidino, morpholino, 3,7-methanoheptamethyleneimino, 2,5-ethanopiperidino, 3-pyrrolinyl and 3-homopyrrolinyl and pharmaceutically acceptable acid addition salts.

The term lower alkyl includes those alkyl groups having 1 to 6 carbon atoms. Pharmaceutically acceptable acid addition salts may include hydrochlorides, hydrobromides, sulfates, nitrates, maleates, fumarates, succinates, tartrates, and the like.

In the present invention a group of compounds of particular importance for their antiflammatory activity are compounds of the formula:

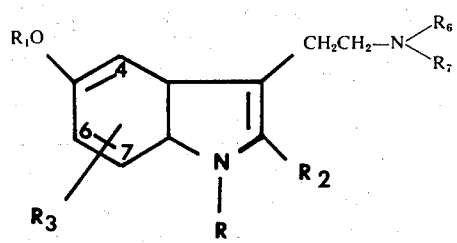

wherein R is hydrogen or lower alkyl; $R_1$, $R_2$, $R_3$ are lower alkyl, $R_3$ being substituted at the 4-, 6- or 7-position of the indole ring;

taken together is 2,5-ethanopiperidino, of 3,7-methanoheptamethyleneimino and pharmaceutically acceptable acid addition salts thereof.

The compounds of this invention can be obtained by the following reaction sequence.

FLOWSHEET

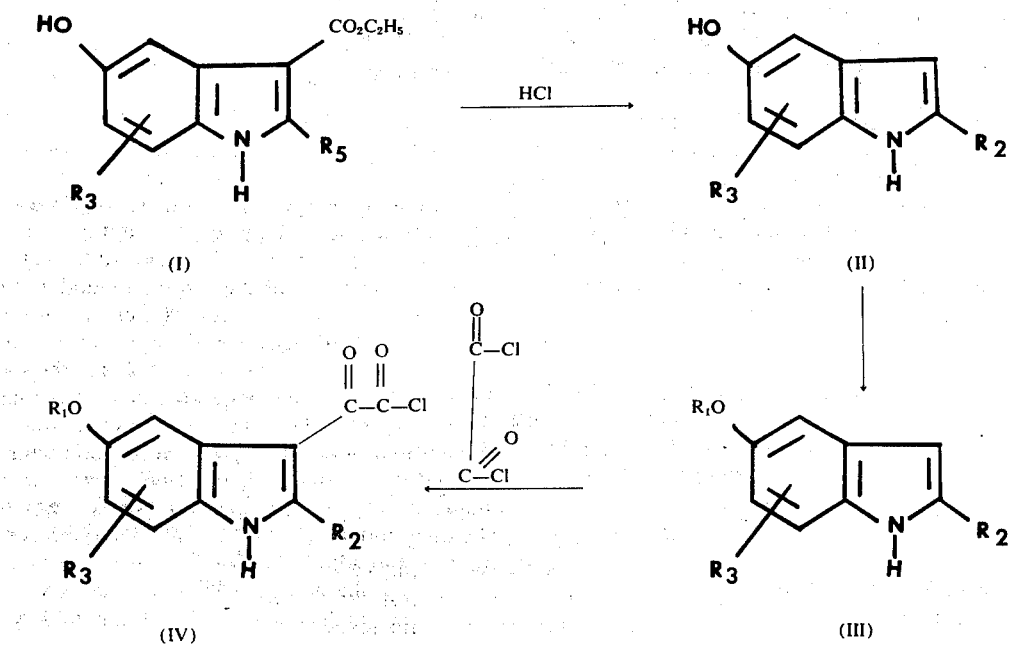

FLOWSHEET -Continued

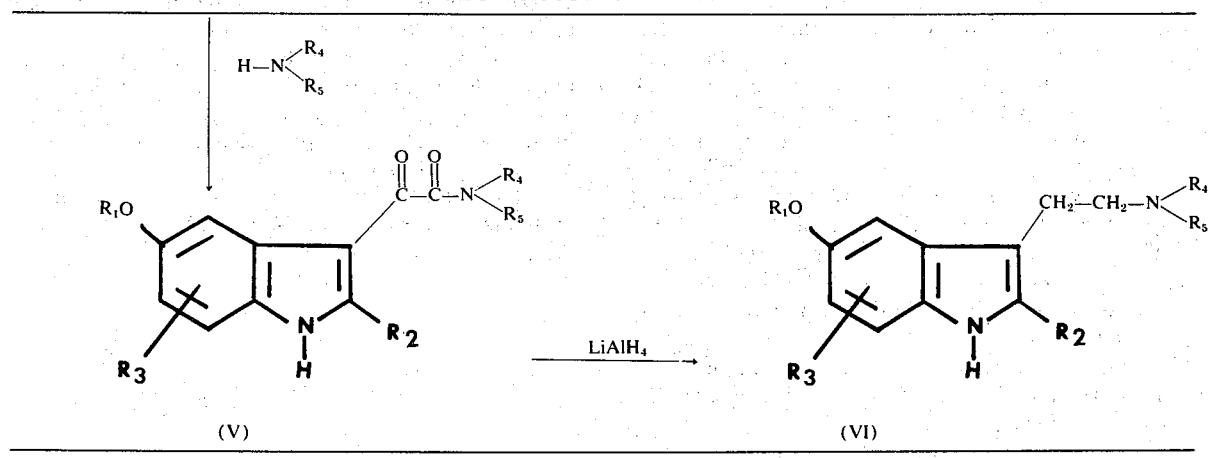

(V)             (VI)

wherein $R_1$, $R_2$, $R_3$, $R_4$ and $R_5$ are as defined above.

The 1-alkyl compounds can be prepared by treatment with a base followed by an alkylating agent.

It is also possible to obtain the 4-methyltriptamine derivatives (VI, $R_3$=4-methyl) by appropriate lithium aluminum hydride reduction of the corresponding 4-trifluoromethylglyoxylamide (V, $R_3$=4-$CF_3$) as described in the patent referred to above. In this instance, when the 4-trifluoromethylamide is heated, preferably for at least 48 hours in refluxing tetrahydrofuran, with lithium aluminum hydride not only is the glyoxylamide reduced to the β-aminoethyl side chain of (VI), but in addition, the 4-trifluoromethyl group undergoes hydrogenolysis to the 4-methyl grouping.

The tryptamine derivatives of this invention are white, crystalline substances recrystallizable from the usual organic solvents. The compounds represented by formula (VI) above are sufficiently basic to form acid-addition salts as indicated hereinbefore.

Compounds of this invention have activity in warm-blooded animals as CNS depressants, analgesics, tranquilizers, diuretic agents and anti-inflammatory agents. These effects in warm-blooded animals are evidenced at doses within a range of from 1.0 mg. to 30 mg. per kilogram of animal body weight per day. Preferably a dosage range of 5 to 20 mg. per kilogram of body weight per day is used.

The central nervous depressant properties of the compounds of the present invention are indicated by several procedures. For example, a test which indicates hypnotic and/or muscle relaxant type activity is represented by the rod walking test, a description of which follows. Groups of 6 mice each are tested for their ability to walk across a horizontal rod in a normal manner after receiving graded doses interperitoneally of a test compound. A median effective dose of the said compound is then estimated.

Another test which indicates tranquilizing activity in warm-blooded animals is represented by a measure of the reduction in motor activity. This is determined by administration of a canidate compound to a group of five mice and a 5 minute count of motor activity (recorded with the use of a photoelectric counter). Counts of 250 or less are considered to indicate a specific reduction statistically (more than two standard derivations) of motor activity. Compounds that appeared to reduce motor activity (equal to or less than 250 count) are administered to additional groups of 5 mice and tested similarly. The dose (MDD) which causes a 50% reduction of motor activity (a count of about 250) is estimated. The use of reduced motor activity as a measure of tranquilizing activity has been described by W. D. Gray, A. C. Osterberg and C. E. Rauh, Archives Internationales de Pharmacodynamic et de Therapie, Vol. 134, p. 198 (1961) and W. J. Kinnard and C. J. Carr, Journal of Pharmacology and Experimental Therapeutics, Vol. 121, 354 (1957). The following Table I summarizes the activity of representative compounds of the present invention.

TABLE I

| Compound | Tranquilizing Activity Rod Walking Dose mg./kg. |
|---|---|
| 1[β-(2,4-dimethyl-5-methoxy-indolyl-3)-ethyl]pyrrolidine | 58 |
| 1[β-(2,7-dimethyl-5-methoxy-indolyl-3)-ethyl]pyrrolidine | 18 |
| 1[β-(2,7-dimethyl-5-methoxy-indolyl-3)-ethyl]morpholine | 86 |
| 1[β-(2,4-dimethyl-5-methoxy-indolyl-3)-ethyl]-3-pyrroline | 50 |
| 1[β-(2,7-dimethyl-5-methoxy-indolyl-3)-ethyl]-3-pyrroline | 68 |

Diuretic activity was determined as follows. Mature male rats weighing between 180 and 300 grams were allowed a normal fluid intake prior to testing. A single oral administration of the test compound was given in 0.5 milliliters of 2% aqueous starch suspension. Four cages (2 rats per cage) served as controls for each measurement. Control animals received only the starch suspension. After administration, the test animals were placed in metabolism cages and observations of the of the amount of urine excreted were made after 5 hours and after 24 hours. These urine measurements were then adjusted to compensate for differing weights of individual animals. The final values recorded were the ratio of the adjusted amount of urine excreted by the test rats to the adjusted amount of urine excreted by the test rats to the amount of urine excreted by the control rats. Statistical procedures as described by Cummings, J. R. et al., *A sequential Probability Ratio Method for Detecting Compounds with Diuretic Activity in Rats*, J. Pharmacol. Exptl. Therap. 128:414–418 (1960), were used to evaluate the test results of the compounds tested.

For determination of diuretic activity in dogs, compounds were tested using the method of J. M. Little and C. Cooper, Jr., Fed. Proc. 9: 296 (1950). Briefly described, dogs were given 35 ml./kg. of water by gavage, deprived of food and water, catheterized 16 hours later, and given an additional 25 mg./kg. of water plus a gelatin capsule of the test compound. The animals were returned to their metabolism cages and observations of the amount of urine excreted were made after 6 hours and after 24 hours. Statistical procedures were used to evaluate the test results of the compounds tested.

Anti-inflammatory tests on rats were conducted on groups of two rats each, injected subcutaneously at the midline of the shaved sacral region with 0.5 ml. of an aqueous 2% carrageenin solution. Carrageenin is a polygalactose sulfate extracted from Irish moss, a type of seaweed. Subcutaneous injection of carrageenin causes rapid formation of an intense subcutaneous inflammatory reaction which develops into a connective tissue granuloma. The test compounds of this invention are suspended in aqueous 1% starch-sodium phosphate buffer solution, pH 6.5, and administered by oral tubing in 0.5 ml. of said buffer; the total dose for each animal is 250 mg./kg. of body weight. One-half of each total dose is administered immediately following the carrageenin injection and the other half of each total dose is administered 4 hours later. Alternatively, the total dose for each animal may be administered all at once immediately following the carrageenin injection. The animals are sacrificed 24 hours after the carrageenin infection. The inflammatory reaction to the carrageenin initiates the formation of exudate and gelatinous material which is removed and weighed. Control animals receive the carrageenin injection and the starch-sodium phosphate buffer solution orally without the test compound. Critical ratios, i.e., weight of exudate and gelatinous material from control animals to the weight of same from test animals (C/T) are calculated. The ratios are then compared by a three-stage sequential screening procedure representing a statistically designated method for detecting anti-inflammatory activity which is significantly different than the variability of control animals at the 95% confidence level:

| STAGE | (C/T ratio) REJECT | (C/T ratio) ACCEPT |
|---|---|---|
| 1. | $(C/T)_1$ | 1.11 or below | 1.65 or above |
| 2. | $(C/T)_1 \times (C/T)_2$ | 1.49 or below | 2.23 or above |
| 3. | $(C/T)_1 \times (C/T)_2 \times (C/T)_3$ | below 2.46 | 2.46 or above |

Thus, a compound which on the frist stage gives a $(C/T)_1=1.11$ or below is rejected; if the ratio is between 1.11 and 1.65, the compound is retested; and if the ratio is 1.65 or above the compound is accepted as active. On the second stage (retest because $(C/T)_1$ is between 1.11 and 1.65) if the product $(C/T_1 \times (C/T)_2$ is 1.49 or below the compound is rejected; if the product is between 1.49 and 2.23, the compound is retested; and if the product is 2.23 or above, the compound is accepted as active. On the third stage, if the product $(C/T)_1 \times (C/T)_2 \times (C/T)_3$ is less than 2.46 the compound is rejected as inactive; but if this product is 2.46 or above, the compound is accepted as an active anti-inflammatory agent.

The following examples describe in detail the preparation of representative compounds of the present invention and denote in many instances the activities found.

EXAMPLE 1

Preparation of 2,7-Dimethyl-5-hydroxyindole

A mixture of 24.5 g. of ethyl 2,7-dimethyl-5-hydroxyindole-3-indolcarboxylate (*Chemistry and Industry*, 1965, 2096) and 750 ml. of 20% hydrochloric acid solution is heated at reflux temperature under nitrogen for 2 hours. The resulting solution is cooled, its pH is adjusted to 6.5, and is then extracted with ethyl acetate. The extract is dried and concentrated and the residue is crystallized from methylene chloride. This procedure gives 6.97 g. of white crystals, melting point 144°–146°C.

EXAMPLE 2

Preparation of 2,7-Dimethyl-5-methoxyindole

A magnetically stirred solution of 6.58 g. of 2,7-dimethyl-5-hydroxyindole (Example 1) in 73 ml. of ethanol and 147 ml. of 2 N sodium hydroxide is heated, under nitrogen, with 18 ml. of methyl sulfate and the mixture is heated at reflux temperature for 1 hour. The cooled mixture is diluted with water and extracted with ethyl acetate. This extract is washed with water, dried, and concentrated and the residue is purified by adsorption chromatography on a magnesia-silica gel column. This procedure gives 5.99 g. of yellow crystals, melting point 69°–71°C.

EXAMPLE 3

Preparation of 2,6-Dimethyl-5-hydroxyindole

Treatment of ethyl 2,6-dimethyl-5-hydroxyindole-3-carboxylate (Chemistry and Industry, 1965, 2096) by the procedure described in Example 1 gives white crystals, melting point 177°–181°C.

EXAMPLE 4

Preparation of 2,6-Dimethyl-5-methoxyindole

Treatment of 2,6-dimethyl-5-hydroxyindole (Example 3) by the procedure described in Example 2 gives white crystals, melting point 101°–103°C.

EXAMPLE 5

Preparation of 2,6-Dimethyl-5-ethoxyindole

Treatment of 2,6-dimethyl-5-hydroxyindole (Example 3) with diethylsulfate by the procedure described in Example 2 gives light yellow crystals, melting point 120°–121°C.

EXAMPLE 6

Preparation of 2,7-Dimethyl-5-ethoxyindole

Treatment of 2,7-dimethyl-5-hydroxyindole (Example 1) with diethylsulfate by the procedure described in Example 2 gives light yellow crystals, melting point 90°–93°C.

EXAMPLE 7

Preparation of Ethyl 2-ethyl-4-chloro-5-hydroxy-7-methylindole-3-carboxylate A solution of 5 g. of 5-chloro-2-methyl-1,4-benzoquinone [Journ. Chem. Soc., 755 (1952)] is treated dropwise with 4.58 g. of ethyl 3-amino-2-pentenoate under nitrogen. The solution is stirred at room temperature for 30 minutes and then is heated at 78°–80°C. for 45 minutes. The reaction mixture is cooled and extracted with ethyl acetate. This extract is washed with water, dried and concentrated. The residue is purified by adsorption chromatography on a magnesium-silica gel column. This procedure gives 3.173 g. of off-white crystals, melting point 120°–125°C.

EXAMPLE 8

Preparation of Ethyl 2-Ethyl-4-chloro-5-methoxy-7-methylindole-3-carboxylate Treatment of ethyl 2-ethyl-4-chloro-5-hydroxy-7-methylindole-3-carboxylate (Example 7) with dimethyl sulfate by the procedure described in Example 2 gives white crystals, melting point 143°–145°C.

EXAMPLE 9

Preparation of 2-Ethyl-4-chloro-5-methoxy-7-methylindole

A mixture of 500 mg. of ethyl 2-ethyl-4-chloro-5-methoxy-7-methylindole-3-carboxylate (Example 8) 1.07 g. of potassium hydroxide and 5 ml. of 95% isobutyl alcohol is heated at reflux temperature for 48 hours. The reaction mixture is cooled and diluted with 40 ml. of water and extracted with ether. The ether is washed with saline, dried and concentrated and the residue is chromatographed on silica gel and eluted with benzine to give the product as off-white crystals, melting point 100°–102°C.

EXAMPLE 10

Preparation of 2-Ethyl-5-methoxy-7-methylindole

A mixture of 3 g. of 2-ethyl-4-chloro-5-methoxy-7-methylindole (Example 9), 2.63 g. of potassium acetate, 3.22 g. of 10% palladium-on-charcoal in 200 ml. of ethanol is shaken in a Parr low pressure hydrogenator apparatus at an initial hydrogen pressure of 30 psi until hydrogen uptake ceases. The reaction mixture is filtered and concentrated. The residue is partitioned between methylene chloride and water. The organic phase is separated and washed with water, dried and evaporated to give 2.418 g. of a yellow oil; melting point of picrate salt 119°–120°C.

EXAMPLE 11

Preparation of t-Butyl 3-aminocrotonate

A stream of ammonia gas is bubbled into 100 g. of t-butyl acetoacetate for 6 hours while the temperature is maintained at 45°C. The aqueous layer is separated and the organic phase is distilled at 72°–75°C. and 2 milliliters of mercury. The product, colorless crystals, melting point 33°–35°C., is recrystallized from hexane to give melting point 37°–39°C.

EXAMPLE 12

Preparation of t-Butyl 5-hydroxy-2-methyl-4-trifluoromethylindole-3-carboxylate A solution of 8.75 g. of trifluoromethyl-p-benzoquinone and 7.85 g. of t-butyl 3-aminocrotonate in 40 ml. of ethanol is heated at reflux temperature for 30 minutes. After the addition of 100 ml. of benzene and 40 ml. of heptane, 80 ml. of solvent is distilled from the mixture which is cooled and filtered to give a tan powder, melting point 218–220°C. (decomposition). The product may be purified by sublimation to give white crystals, melting point 225°–227°C. (decomposition).

EXAMPLE 13

Preparation of t-Butyl 5-methoxy-2-methyl-4-trifluoromethylindole-3-carboxylate A solution of 10 g. of 5-hydroxy-2-methyl-4-trifluoromethylindole-3-carboxylate and 4.0 g. of dimethyl sulfate in 125 ml. of acetone containing 9.0 g. of anhydrous potassium carbonate is heated at reflux temperature for 3 hours. The solids are removed by filtration and the filtrate is evaporated. The residue is crystallized from benzene-hexane to give white needles, melting point 190°–192°C. The product may be sublimed to give white crystals, melting point 188°–191°C.

EXAMPLE 14

Preparation of 5-Methoxy-2-methyl-4-trifluoromethylindole

A solution of 7.0 g. of t-butyl 5-methoxy-2-methyl-4-trifluoromethylindole-3-carboxylate and 600 mg. of p-toluene-sulfonic acid in 400 ml. of toluene is heated at reflux for 1 hour. After cooling, the purple solution is washed with water, dried with magnesium sulfate and evaporated to give a deep red oil. The oil is dissolved in ether, passed through a pad of silica gel and concentrated with n-hexane to give the product as white needles, melting point 122°–125°C. (decomposition).

EXAMPLE 15

Preparation of 5-Methoxy-2,4-dimethylindole

A solution of 500 mg. of 5-methoxy-2-methyl-4-trifluoromethylindole in 75 ml. of tetrahydrofuran containing 500 mg. of lithium aluminum hydride is heated at reflux temperature for 48 hours. After cooling, the hydride is decomposed with water and the inorganic residue is removed by filtration. The filtrate is evaporated, dissolved in ether, washed with water, dried, and again evaporated. The crude residue is chromatographed on silica gel and eluted with methylene chloride-n-hexane (6:5) to give the product as a tan solid, melting point 50°C. The product may be sublimed to give white, fluffy crystals, melting point 54°–55°C.

EXAMPLE 16

Preparation of
2,7-Dimethyl-5-methoxyindole-3-glyoxylic Acid Chloride and
2,7-Dimethyl-5-methoxyindole-3-N,N-dimethylglyoxylamide A solution of 2.0 g. of 2,7-dimethyl-5-methoxyindole (Example 2) in 70 ml. of ether at 0°C. is treated dropwise with 1.72 ml. of oxalyl chloride in 5 ml. of ether. The mixture is stirred for 30 minutes and then filtered. The yellow solid (2,7-dimethyl-5-methoxyindole-3-glyoxylic acid chloride) thus obtained is added portionwise to 40 ml. of ice cooled 25% aqueous dimethylamine. After 30 minutes the resulting mixture is filtered. The procedure gives 1.40 g. of N,N-dimethylamide as white crystals, melting point 252°–254°C.

EXAMPLE 17

Preparation of
2,6-Dimethyl-5-methoxyindole-3-glyoxylic acid Chloride

Treatment of 2,6-dimethyl-5-methoxyindole (Example 4) with oxalyl chloride by the procedure of Example 16 is productive of 2,6-dimethyl-5-methoxyindole-3-glyoxylic acid chloride.

EXAMPLE 18

Preparation of
2,4-Dimethyl-5-methoxyindole-3-glyoxylic Acid Chloride

Treatment of 2,4-dimethyl-5-methoxyindole with oxalyl chloride by the procedure of Example 16 gives 2,4-dimethyl-5-methoxyindole-3-glyoxylic acid chloride.

EXAMPLES 19–33

By the procedure of Example 16, 2,7-dimethyl-5-methoxyindole-3-glyoxylic acid chloride (Example 16), 2,6-dimethyl-5-methoxyindole-3-glyoxylic acid chloride (Example 17), or 2,4-dimethyl-5-methoxyindole-3-glyoxylic acid chloride (Example 18), is treated with the appropriate amine to give the corresponding 2,(4,6 or 7)-dimethyl-5-methoxyindole-3-glyoxamides of Table II as follows:

TABLE II 2, (4-, 6 or 7)-Dimethyl-5-methoxyindole-3-glyoxylamides

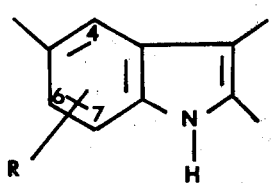

| EXAMPLE | R | R₁ | MELTING POINT, °C. |
|---|---|---|---|
| 19 | 4—CH₃ | 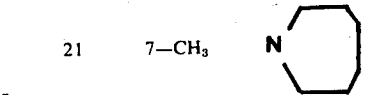 | 174–177 |
| 20 | 7—CH₃ | 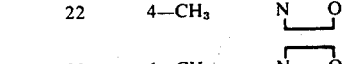 | 191–192 |

TABLE II-Continued 2, (4-, 6 or 7)-Dimethyl-5-methoxyindole-3-glyoxylamides

| EXAMPLE | R | R₁ | MELTING POINT, °C. |
|---|---|---|---|
| 21 | 7—CH₃ | 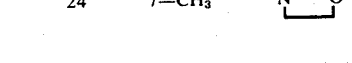 | softens 90–110, melts 142 |
| 22 | 4—CH₃ |  | 151–153 |
| 23 | 6—CH₃ | | 290–293 |
| 24 | 7—CH₃ | | 220–222 |
| 25 | 4—CH₃ |  | 233–235 |
| 26 | 6—CH₃ | | 238–240 |
| 27 | 7—CH₃ |  | 234–244 |
| 28 | 7—CH₃ |  | 191–192 |
| 29 | 7—CH₃ |  | 255–257 |
| 30 | 4—CH₃ | 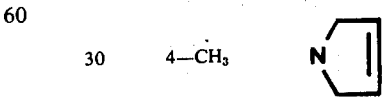 | 167–169 |
| 31 | 6—CH₃ |  | 190–192 |

TABLE II-Continued 2,(4-, 6 or 7)-Dimethyl-5-methoxyindole-3-glyoxylamides

| EXAMPLE | R | R₁ | MELTING POINT. °C. |
|---|---|---|---|
| 32 | 7—CH₃ | 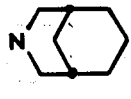 | 214–125 |
| 33 | 7—CH₃ |  | 185–190 |

EXAMPLES 34–48

Submission of the appropriate 2, (4, 6 or 7)diloweralkyl 5-methoxyindole-3-glyoxylamides (Table II) to treatment with lithium aluminum hydride by heating at refluxing temperature in a solvent such as tetrahydrofuran followed by treatment with sodium potassium tartrate gives the 2, (4, 6, or 7)-diloweralkyl 5-methoxytryptamines of Table III below. If necessary, other acids, such as maleic and succinic, can be substituted for the tartaric acid to give the corresponding amine acid addition salts.

TABLE III 2,(4,6 or 7)-Dimethyl-5-methoxytryptamines

| EXAMPLES | R | R₁ | MELTING POINT °C. (salt) |
|---|---|---|---|
| 34 | 4—CH₃ |  | 120–122 (free base) |
| 35 | 7—CH₃ |  | 121–122 (maleate) |
| 36 | 4—CH₃ |  | 126–128 (free base) |
| 37 | 6—CH₃ |  | 153–155 (maleate) |
| 38 | 7—CH₃ |  | 137–138 (maleate) |
| 39 | 7—CH₃ |  | 127–129 (maleate) |
| 40 | 4—CH₃ |  | 183–184 (succinate) |
| 41 | 6—CH₃ |  | 146–148 (free base) |
| 42 | 7—CH₃ |  | 110–113 (free base) |
| 43 | 4—CH₃ |  | 127–129 (free base) |
| 44 | 6—CH₃ |  | 182–185 (fumarate) |
| 45 | 7—CH₃ |  | 135–137 (free base) |
| 46 | 7—CH₃ |  | 189–193 (fumarate) |
| 47 | 7—CH₃ | | 122–123 (fumarate) |
| 48 | 7—CH₃ | | 190–192 (fumarate) |

The compounds of Examples 35, 37, 38, 39, 41, 42, 44, and 47 show analgesic activity.

The compounds of Examples 37, 39, 41, 42, 44, 45, 46, 47, and 48 show anti-inflammatory activity.

The compounds of Examples 35, 37, 41, 42, 45, 46 and 48 show diuretic activity.

EXAMPLE 49

Preparation of 3-[2-(2,7-Dimethyl-5-ethoxy-3-indolyl)ethyl]-3-azabicyclo[3.2.2]nonane By the procedure of Example 16, 5-ethoxy-2,7-dimethylindole (Example 6) is treated with oxalyl chloride and the resulting 5ethoxy-2,7-dimethylindole-3-glyoxylic acid chloride is treated with 3-azabicyclo[3.2.2]nonane by the procedure of Example 16 to give the corresponding 3-glyoxamide derivative (melting point 242°–243°C.) which is then reduced with lithium aluminum hydride by the procedure described hereinbefore to give the subject compound as the maleate salt with melting point at 200°–202°C. This compound shows analgesic activity.

EXAMPLE 50

Preparation of 3-[2-Ethyl-7-methyl-5-methoxy-3-indolyl)ethyl]-3-azabicyclo[3.2.2]nonane By the procedure of Example 16, 2-ethyl-5-methoxy-7-methylindole (Example 10) is treated with oxalyl chloride and the resulting 2-ethyl-5-methoxy-7-methylindole-3-glyoxylic acid chloride is treated with 3-azabicyclo[3.2.2]nonane by the procedure of Example 16 to give the corresponding 3-glyoxamide derivative (melting point 193°–195°C.) which is then reduced with lithium aluminum hydride by the procedure previously described to provide the subject compound with melting point at 108°–110°C. after recrystallization from ether-petroleum ether (boiling point 30°–60°C.).

This compound has activity as an analgesic agent.

EXAMPLE 51

Preparation of 5-Chloro-2-ethyl-1,4-benzoquinone

This quinone is prepared by addition of hydrogen chloride gas to ethyl-1,4-benzoquinone according to the procedure of Burton and Praill, [Jour, Chemical Soc. 755 (1952)] followed by silver oxide oxidation in accordance with the procedure [H. H. Hodson and F. H. Moore, Jour. Chemical Soc., 2036 (1926)] described for the preparation of the corresponding 5-chloro-2-methyl-1,4-benzoquinone. The yield is 42%, melting point 65°–66°C.

EXAMPLE 52

Preparation of t-Butyl 4-Chloro-7-ethyl-5-hydroxy-2-methylindole-3-carboxylate

This compound is prepared in 55% yield by the condensation of 5-chloro-2-ethyl-1,4-benzoquinone (Example 51) and t-butyl 3-amino-crotonate [R. Littell and G. R. Allen, Jr., J. Org. Chem., 33, 2064 (1968)] by the procedure described [J. F. Poletto and M. J. Weiss, J. Org. Chem., 35, 1190 (1970)] for the preparation of t-butyl 4-chloro-5-hydroxy-2,7-dimethylindole-3-carboxylate. The crude product, melting point 178°–180°C., is recrystallized from acetone-hexane to give off-white crystals, melting point 181°–182°C., $\lambda$max 218, 248, 285 m$\mu$ ($\epsilon$26,400, 14,600, 8,950); 3.0, 3.3, 5.92, 6.25, 8.55 $\mu$.

EXAMPLE 53

Preparation of t-Butyl 4-Chloro-7-ethyl-5-methoxy-2-methylindole-3-carboxylate

Treatment of t-butyl 4-chloro-7-ethyl-5-hydroxy-2-methylindole-3-carboxylate (Ex. 52) with dimethylsulfate by the procedure described in Example 2, gives t-butyl 4-chloro-7-ethyl-5-methoxy-2-methylindole in 84% yield, melting point 145°–147°C.

EXAMPLE 54

Preparation of 4-Chloro-7-ethyl-5-methoxy-2-methylindole

Treatment of t-butyl 4-chloro-7-ethyl-5-methoxy-2-methylindole-3-carboxylate (Ex. 53) with p-toluenesulfonic acid by the procedure described in Example 14 gives 4-chloro-7-ethyl-5-methoxy-2-methylindole in 78% yield. Recrystallization of a sample from ether-petroleum ether (30 cc.) furnishes near white crystals, melting point 90°–91°C. $\lambda$max 278 m$\mu$ ($\epsilon$11,150); 2.95, 3.4, 6.25 $\mu$.

EXAMPLE 55

Preparation of 7-Ethyl-5-methoxy-2-methylindole

Catalytic dechlorination of 4-chloro-7-ethyl-5-methoxy-2-methylindole (Example 54) by the procedure of Example 10 furnishes 7-ethyl-5-methoxy-2-methylindole in 90% yield, melting point of 70°–72°C., recrystallization from ether-petroleum ether gives off-white crystals, melting point 73°–74°C. $\lambda$max 215, 272, 292, 304 m$\mu$ ($\epsilon$33,000, 9,850; 6,800, 4,380); 3.0, 3.4, 6.25 $\mu$.

EXAMPLE 56

Preparation of 3-[7-Ethyl-5-methoxy-2-methyl-3-indolyl)ethyl]-3-azabicyclo[3.2.2]nonane By the procedure of Example 16, 7-ethyl-5-methoxy-2-methylindole (Example 55) is treated with oxalyl chloride and the resulting 7-ethyl-5-methoxy-2-methylindole-3-glyoxylic acid chloride is treated by the procedure of Example 16 with 3-azabicyclo[3.2.2]nonane to give the corresponding 3-glyoxamide derivative (melting point 190°–191°C.) which is then reduced with lithium aluminum hydride by the procedure described above to provide the subject compound as the maleate salt with melting point at 173°–174°C. This compound shows a rod walking dose of 70 mg./kg.

EXAMPLE 57

Preparation of 3-[2-(5-Methoxy-1,2,7-trimethyl-3-indolyl)ethyl]-3-azabicyclo[3.2.2]nonane A solution of 1.664 g. of 3-[2-(2,7-dimethyl-5-methoxy-3-indolyl)ethyl]-3-azabicyclo[3.2.2]nonane (Example 42 in 10 ml. of dimethylsulfoxide is added to a cold solution of methylsulfinyl carbanion prepared from sodium hydride and dimethylsulfoxide. The resulting solution is stirred at room temperature for 1 hour, after which 725 mg. of methyl iodide is added. The reaction is stirred for 3 hours during which time a solid precipitates. This procedure gives 1.44 g. of off-white crystals, melting point 148°–152°C.

This compound shows activity as an analgesic and anti-inflammatory agent.

We claim:

1. The compound 1-[β-(2,6-dimethyl-5-methoxy-3-indolyl)ethyl]-3-pyrroline.
2. The compound 1-[β-(2,7-dimethyl-5-methoxy-3-indolyl)ethyl]-3-pyrroline.
3. The compound 1-[β-(2,7-dimethyl-5-methoxy-3-indolyl)ethyl]-3-homopyrroline.

* * * * *